C. D. LOVELACE.
TIRE INFLATING PUMP.
APPLICATION FILED FEB. 7, 1916.
1,284,389.
Patented Nov. 12, 1918.
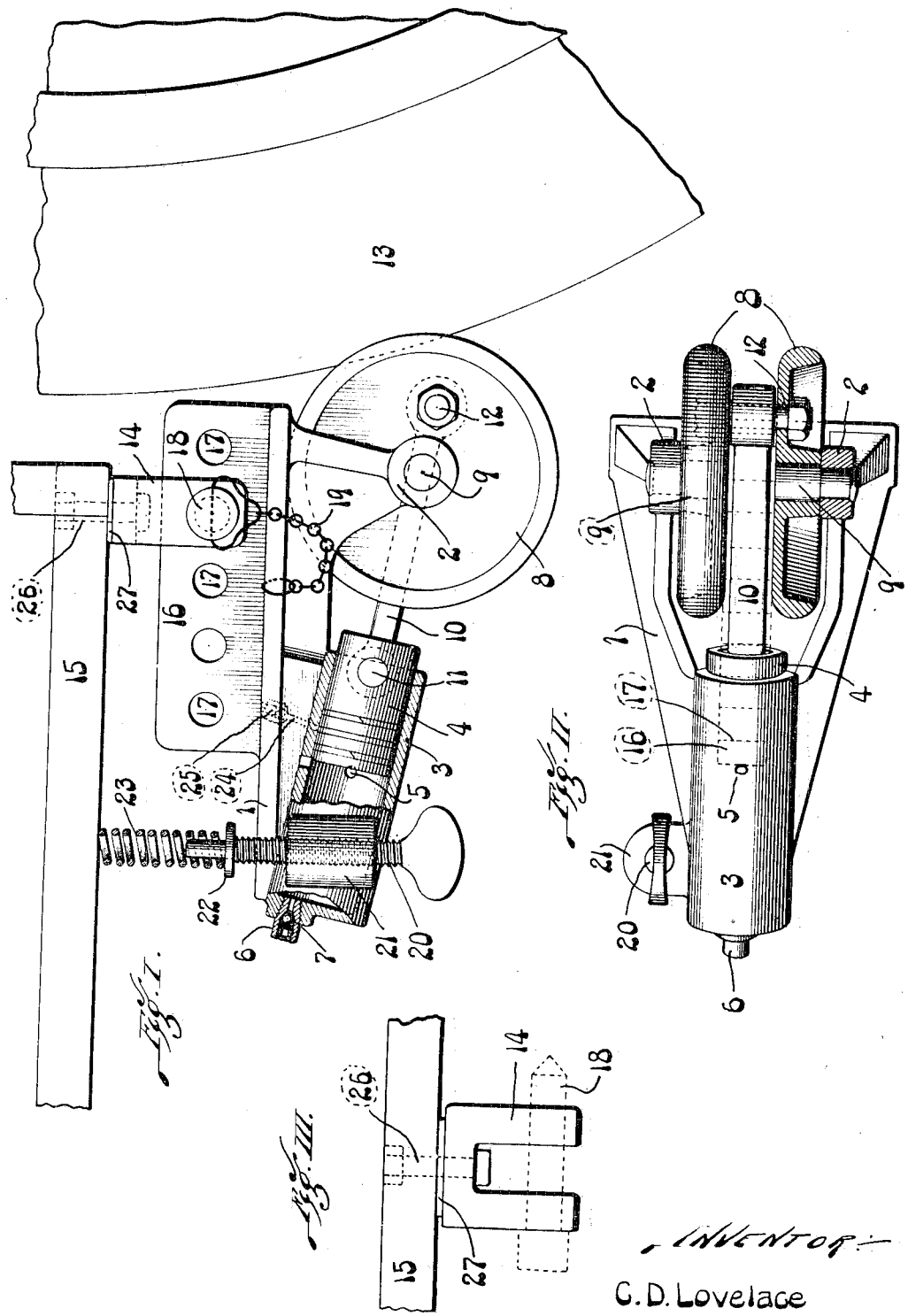
INVENTOR
C. D. Lovelace
By Knight & Cook
attys.

UNITED STATES PATENT OFFICE.

CHARLES D. LOVELACE, OF SAN ANGELO, TEXAS.

TIRE-INFLATING PUMP.

1,284,389.  Specification of Letters Patent.  Patented Nov. 12, 1918.

Application filed February 7, 1916. Serial No. 76,593.

*To all whom it may concern:*

Be it known that I, CHARLES D. LOVELACE, a citizen of the United States of America, a resident of San Angelo, in the county of Tom Green, State of Texas, have invented certain new and useful Improvements in Tire-Inflating Pumps, of which the following is a full, clear, and exact description, reference being had to the accompanying drawings, forming a part of this specification.

My invention relates to a pumping device for inflating automobile tires. The preferred form of the invention comprises a pump having an operating wheel adapted to engage a drive wheel of an automobile, and means for securing the pump to an automobile at a point near the drive wheel. One of the objects of the invention is to produce a simple and efficient means for forcing the operating wheel of the pump into engagement with the drive wheel. Another object is to provide an adjustable attaching device whereby the pump may be secured to an automobile at different points, so that the operating wheel of the pump may be located at a point where it will firmly engage the drive wheel of the automobile. The adjustable attaching means is so constructed that the pump may be applied to different automobiles.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a side elevation, partly in section, illustrating a pump constructed in accordance with the invention and also showing portions of the running board and traction wheel of the automobile to which the pump is applied.

Fig. II is an inverted plan view of the pump shown in Fig. I.

Fig. III is a detail view of a hanger whereby the pump is secured to the automobile.

The pump comprises a web 1, bearings 2 depending therefrom, and a cylinder 3 preferably formed integral with said web. The cylinder is open at one end to receive a piston 4, and provided with intake ports 5 at points intermediate of its ends. The closed end of the cylinder is provided with a connection 6 to which a hose, or the like, may be attached to conduct compressed air from the cylinder to the tires that are to be inflated. The connection 6 contains a check valve 7.

The piston 4 is adapted to open the intake ports 5 as shown in Fig. I, and it may be moved toward the discharge end of the cylinder to compress the air and discharge it through the connection 6. 8 designates friction wheels separated from each other to form a double drive wheel as shown in Fig. II, and rotatably fitted to stub shafts 9, the latter being secured to the bearings 2. A piston rod 10 is pivotally connected to the piston at 11 and secured to the friction wheels 8 by means of a crank pin 12. This crank pin is mounted in both of the friction wheels and it extends transversely through the piston rod as shown in Fig. II. Each friction wheel 8 is provided with a rounded periphery adapted to engage the tread of a traction wheel of an automobile. When the pump is in operation its friction wheels 8 frictionally engage the tire 13 of a rear wheel of the automobile, as shown in Fig. I.

The adjustable attaching device, whereby the pump is secured to the automobile, comprises a hanger 14 attached to the underside of the running board 15 at a point near a traction wheel of the automobile. The pump is provided with an attaching flange 16 which extends upwardly from the web 1, said attaching flange being adapted to enter a bifurcated portion of the hanger 14. A series of pivot-receiving holes 17 is formed in the attaching flange 16, and a pivot pin 18, fitted to the hanger 14, is adapted to pass through any one of the holes 17. It will be noted that this adjustable attaching means allows the pump to be located in several different positions with respect to the traction wheel, the object being to provide means for securing the pump to different automobiles. The pivot pin 18 may be readily withdrawn from the attaching flange 16 and hanger 14, and the pump may be very easily secured to the automobile by means of this detachable pivot pin. The pivot pin is preferably secured to the pump by means of a chain 19.

The means for forcing the friction wheels 8 into engagement with the automobile tire 13 comprises a screw 20 passing through a boss 21 at one side of the pump cylinder, a spring seat 22 near the upper end of said screw, and a compression spring 23 interposed between said spring seat and the running board 15. The pump is in the form of a lever fulcrumed on the pivot pin 18 so that the spring 23 will force the friction wheels into engagement with the traction wheel of the automobile. The desired frictional engagement may be obtained by adjusting the screw 20 to vary the force of the spring 23.

24 designates an oil passageway leading to the piston 4 and provided with a check valve 25 at its upper end.

In the practical use of my tire pump, one of the rear drive wheels of the automobile is elevated from the ground by any suitable means, such as an ordinary lifting jack placed under the rear axle, and the pump is attached to the running board by means of the pivot pin 18. The screw 20 is adjusted to insure the desired frictional engagement between the friction wheels 8 and the tire 13 of the automobile wheel. The elevated traction wheel is rotated through the medium of the automobile motor, thus rotating the friction wheels 8 so as to reciprocate the piston 4. The compressed air passing from the cylinder is conducted from the connection 6 to the tire that is to be inflated.

The hanger 14 is preferably rotatably secured to the running board by means of a vertical pivot bolt 26. 27 designates a washer interposed between the bottom of the running board and the top of the hanger 14. This rotatable connection between the hanger and running board allows the pumping device to be turned about the axis of the vertical pivot bolt, thus allowing the operator to adjust the pump to a position wherein both of the friction wheels 8 will firmly engage the tire 13 at opposite sides of the center of the tread. However, it is not necessary for the operator to make an accurate adjustment of the pump, for it will be adjusted automatically by turning slightly on the axis of bolt 26 if both friction wheels 8 do not firmly engage the tire, this being due to the action of the rotating tire and the spring 23 which tends to force both wheels onto the tire.

I claim:—

1. In a pumping device, a pump provided with an operating wheel, adjustable attaching means including a member adapted to be secured to an automobile, a member secured to the pump and a pivot uniting said members and constituting a fulcrum for the pump, one of said members being adjustable with respect to the other to allow the pump to be adjusted toward and away from a drive wheel of the automobile, thereby changing the location of the fulcrum of the pump; and means for forcing said operating wheel into engagement with said drive wheel.

2. In a pumping device, a pump support adapted to be attached to an automobile, a pump having a series of pivot-receiving openings, a pivot pin adapted to enter said pump support and also adapted to enter any of said pivot-receiving openings so as to allow the pump to be adjusted toward and away from a drive wheel of the automobile, said pump being provided with an operating wheel, and means for forcing said operating wheel into engagement with said drive wheel.

3. In a pumping device, a hanger adapted to be secured to the under-side of the running board of an automobile, a pivot pin fitted to said hanger, a pump depending from said pivot pin, said pump having a series of openings each of which is adapted to receive said pivot pin and said openings being so formed that the pump may be adjusted toward and away from a traction wheel of the automobile, said pump having an operating wheel adapted to engage said traction wheel, a screw adjustably fitted to said pump, and a spring associated with said screw and adapted to engage the under-side of said running board so as to force said operating wheel into engagement with said traction wheel.

CHARLES D. LOVELACE.